Dec. 8, 1970   N. FREEDMAN   3,546,695
RADAR TRANSPONDOR SYSTEM
Filed March 3, 1969   2 Sheets-Sheet 1
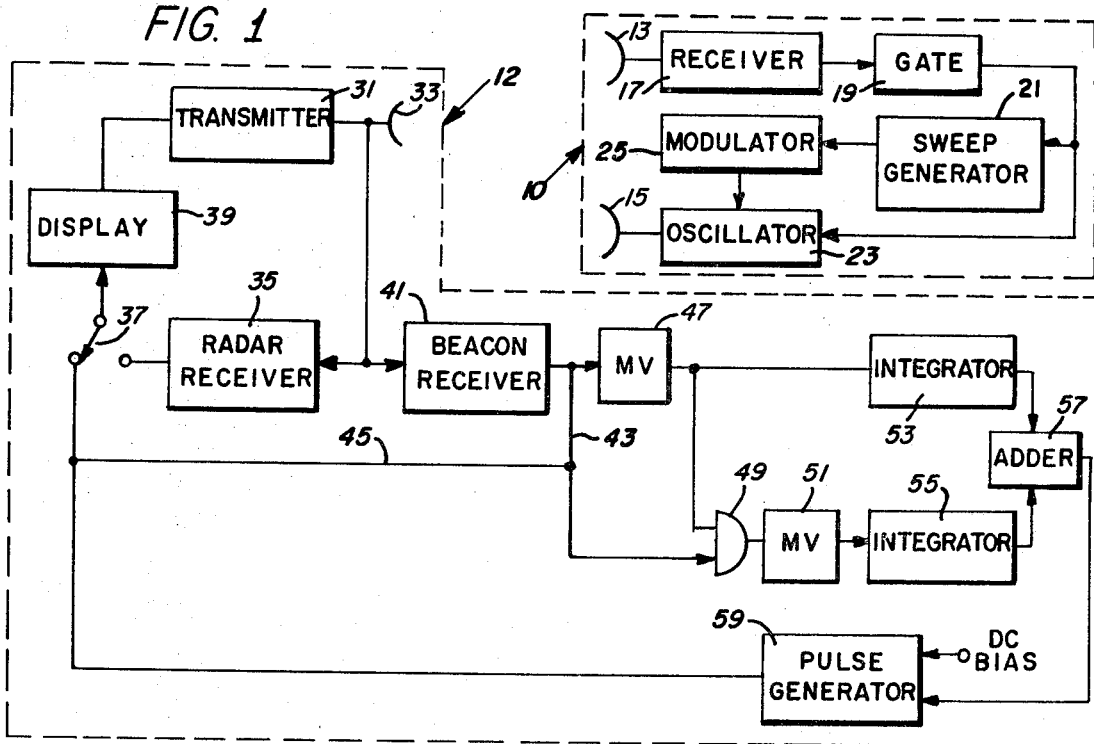
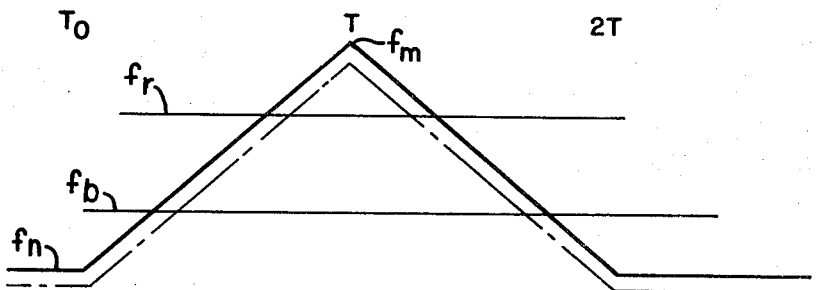
INVENTOR
NATHAN FREEDMAN

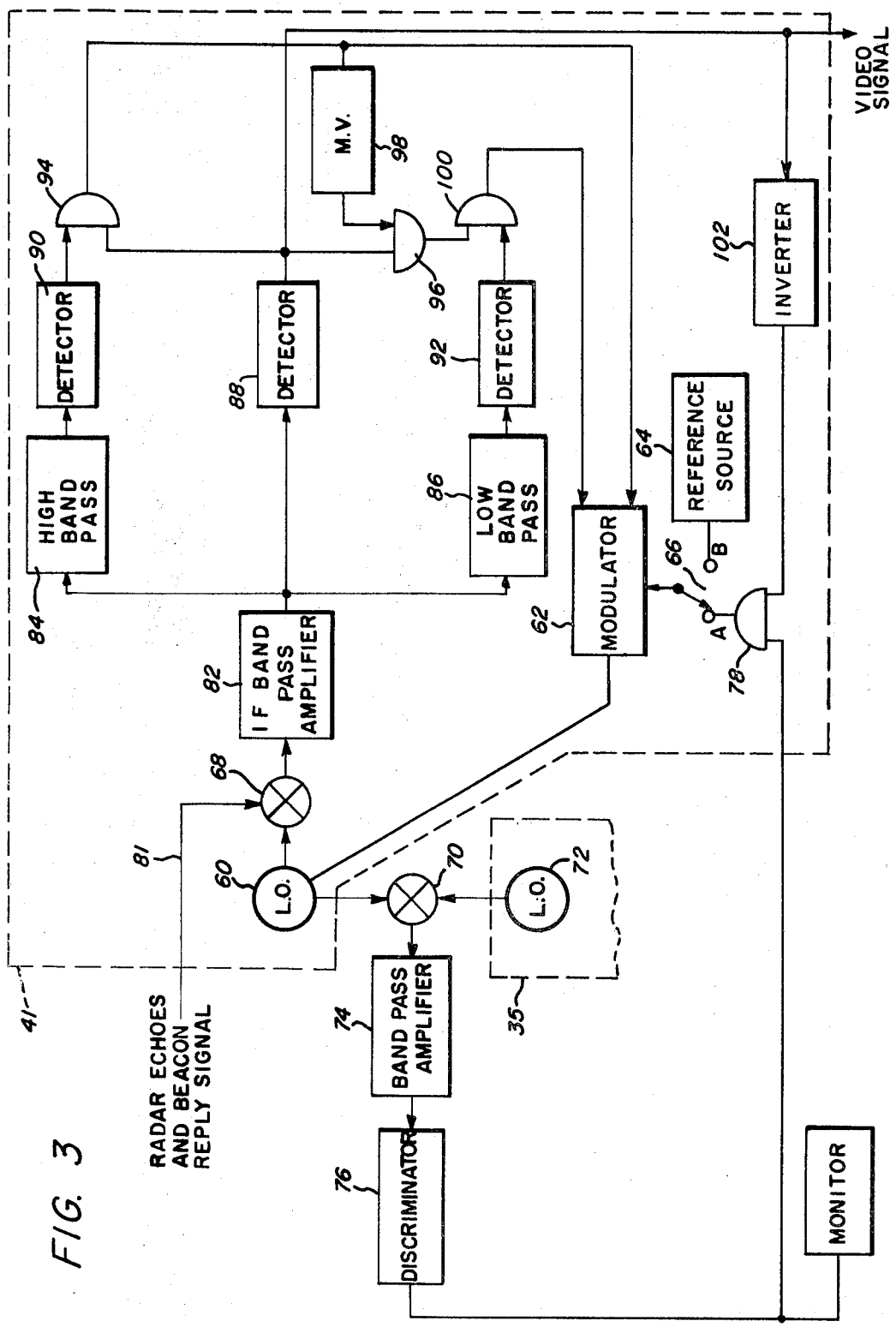

United States Patent Office 3,546,695
Patented Dec. 8, 1970

3,546,695
RADAR TRANSPONDOR SYSTEM
Nathan Freedman, West Newton, Mass., assignor to Raytheon Company, Lexington, Mass., a corporation of Delaware
Filed Mar. 3, 1969, Ser. No. 803,549
Int Cl. G01s 9/56
U.S. Cl. 343—6.5      4 Claims

ABSTRACT OF THE DISCLOSURE

An improved radar transpondor system in which a radar beacon, in response to receipt of a proper interrogating signal, or signal train, produces at least one frequency modulated reply signal. In one embodiment such reply signal is linearly varied from a first limit to a second limit and back to the first limit so that any receiver responsive to signals within the two limits produces two responses with the center point between the two always delayed a predetermined amount from the time of occurrence of the echo signal from the radar beacon. In another embodiment, the receiver for the radar beacon reply signal is arranged to track on such signal, permitting frequency modulation thereof in any desired manner.

BACKGROUND OF THE INVENTION

It is known in the art that a satisfactory transpondor for use with any of a plurality of radar systems, each operating in different, relatively narrow frequency bands with a relative wide band of radio frequencies may be constructed by providing a receiver which, upon proper interrogation by pulses from any of the radar systems, transmits a frequency modulated signal covering such relatively wide band of radio frequencies. Consequently, a transpondor of this type will produce a reply signal detectable by the interrogating radar system, whatever may be the particular narrow band of frequencies in which such system is operated. An example of a transpondor such as has just been referred to is the device described in U.S. Pat. No. 2,544,204 issued to Whitfield et al. on Mar. 6, 1951.

It is also known in the art that, on many occasions when a transpondor reply must be separated, for one reason or another, from the echo signals returning to a radar system, the transpondor reply signals may be distinguished easily by separating the transpondor reply frequency from the radar frequency, thus permitting the use of different receivers. An example of such a transpondor is shown in U.S. Pat. No. 3,158,862 issued to J. P. Chisholm on Nov. 24, 1964.

While frequency modulated transpondors of the type contemplated by Whitfield et al. cited hereinbefore have been known for many years, practical considerations have limited their usefulness. That is, because the interrogating radar accepts only a relatively narrow band in the spectrum of frequencies transmitted by the transpondor, the efficiency of the system is also relatively low. Consequently, to attain satisfactory working ranges for transpondors of this type (especially when the transpondor is to be mounted on modern high speed aircraft) it is necessary that relatively high powered transmitters, such as a klystron, be used rather than solid state devices. It is obvious, therefore, that a transpondor system which is not limited in efficiency as are conventional frequency modulated types would be highly desirable. Further, in order to cover a bandwidth of practical size within a short period of time, such transpondors must be modulated at a very high rate. This, in turn, leads to undesirable complications in the required circuitry.

Therefore, it is a primary object of this invention to provide an improved radar transpondor which, when interrogated, transmits a broad band signal which contains range information and which may be detected by any radar responsive to signals within such band.

Another object of this invention is to provide an improved frequency modulated radar transpondor system which utilizes substantially all of the frequency modulated energy received at the interrogating radar.

Still another object of this invention is to provide an improved radar transpondor which is simple in construction, dependable in operation and which may utilize solid state oscillators.

SUMMARY OF THE INVENTION

These and other objects of this invention are provided by a transpondor which includes a wide band receiver which, when it is interrogated by a proper signal, produces a gating signal operative to turn on a frequency modulated oscillator, such modulation causing the output signal from the oscillation to sweep, at least once, up and down through a predetermined frequency band centered preferably, on the radar frequency. The frequency modulated signal from the transpondor oscillator is transmitted back to the radar system which preferably includes a beacon receiver (explained in detail hereinafter) in addition to a conventional receiver. The output signal of the beacon receiver, consisting of at least one pair of pulses, is then processed to identify the transpondor and to determine its range. If there is no special beacon receiver, the processing may be done using the normal radar receiver.

BRIEF DESCRIPTION OF THE DRAWINGS

For a more complete understanding of this invention reference is now made to the drawings in which:

FIG. 1 is a block diagram of a preferred transpondor system according to this invention;

FIGS. 2(a), 2(b), 2(c), 2(d) and 2(e) are sketches showing the waveforms at various points in the block diagram of FIG. 1; and FIG. 3 is a block diagram of the portions of a modified beacon reply receiver usable in the transpondor system of FIG. 1.

DESCRIPTION OF THE PREFERRED EMBODIMENT

Referring now to FIG. 1, it may be seen that a transpondor according to one embodiment of this invention includes a radar beacon 10 which is mounted on an aircraft or other airborne vehicle and radar set 12 to interrogate the radar beacon 10. Such beacon, as illustrated, includes a receiving antenna 13 and a transmitting antenna 15 although, in practice, these two elements would probably be combined. The receiving antenna 13 is connected to a wide band receiver 17, which may be of any conventional type, having its output signal fed to a gate generator 19. The latter preferably is a monostable multivibrator having an astable period equal in length to the period of time desired to accommodate the transmitter portion of the radar beacon 10 as will later be discussed. The output of the gate generator 19 is fed to a sweep generator 21 and to an oscillator 23. The sweep generator 21 is of conventional construction, here preferably producing a triangular waveform to control the output of a modulator 25. The oscillator 23 here is a conventional voltage controlled radio frequency oscillator producing, when gated on and modulated, radio frequency energy within selected frequency bandpass limits of the system, the instantaneous deviation of the frequency produced from its unmodulated frequency being determined by the output of the modulator 25.

The radar set 12 includes a transmitter 31 which feeds, through conventional transmission elements (not shown), an antenna 33. It will be recognized, of course, that the output signal of the transmitter, propagated in a beam from the antenna 33 to the receiving antenna 13 of the radar beacon 10, may be coded in any desired manner and that the wide band receiver 17 and the gate generator 19 may be arranged so as to be responsive only to a particular code. The radar set 12 also includes a radar receiver 35 which may, via switch 37, be connected to a display unit 39 of a conventional type, as a plan position indicator. In the preferred embodiment of the invention the radar set 12 also includes a beacon receiver 41 of the heterodyne type which produces an output signal, connected over lines 43, 45, to the switch 37 and then to the display unit 39. The output signal of the beacon receiver 41, as will be shown hereinafter, consists of two pulses of video energy, each such pulse occurring when the frequency of the beacon reply signal as received at the antenna 13 is heterodyned in the beacon receiver 41. It is here noted that, in any embodiment of this invention, the bandwidth of the output signal from the oscillator 23 in the radar beacon 10 is selected so that intermediate frequency signals are generated in the radar receiver 35 and the beacon receiver 41 regardless of drift of the oscillator 23. The output signal from the beacon receiver 41 is also, as illustrated, fed directly to a monostable multivibrator 47 and, via an AND gate 49, to a monostable multivibrator 51. The astable period of the monostable multivibrator 47 is equal substantially to the astable period of the gate generator 19 (in the radar beacon 10) while the astable period of the monostable multivibrator 51 is substantially one-half the astable period of the gate generator 19. It may be seen, therefore, that the first video pulse out of the beacon receiver 41 triggers the monostable multivibrator 47 to force it into its astable condition, but that the second video pulse from the beacon receiver 41 (which occurs when the monostable multivibrator 47 is in its astable condition) has no effect on the monostable multivibrator 47. The AND gate 49, being enabled as shown only when the monostable multivibrator 47 is in its astable condition, serves to prevent the first video pulse out of beacon receiver 41 from triggering monostable multivibrator 51 but does permit the second video pulse out of the beacon receiver 41 to trigger the monostable multivibrator 51. The normal outputs of the monostable multivibrators 47, 51 are fed, respectively, to an integrator 53 and an integrator 55, each of which has an integration constant which causes the output from each to approximate the positive-going portion of the triangular waveform generated in the sweep generator 21 of the radar beacon 10. The output signals from the integrators 53, 55 are each fed as shown through an adder 57 to a pulse generator 59, which may be a blocking oscillator of conventional construction. A source of DC bias (not shown) is also connected to the pulse generator 59 so that a pulse signal is produced when the signal from the adder 57 overcomes such DC bias. The output of the pulse generator 59 is fed, via switch 37, to the display unit 39.

Turning now to the waveforms shown in FIGS. 2(a) through 2(e), the explanation of the operation of the circuits shown in FIG. 1 will become clear. Thus, FIG. 2(a), the abscissa of which is time and the ordinate of which is frequency, shows the instantaneous frequency of the energy from the transmitting antenna 15 in the radar beacon 10. It will be recognized immediately that FIG. 2(a) also may be taken to be a representation of the frequency of the signal received at the antenna 33 of the radar set 12, if any Doppler shift is disregarded. It is noted in passing that disregarding Doppler shift does not introduce error because the effect of any such shift is simply to translate the waveform shown in FIG. 2(a) to a position such as shown in the dashed line in such figure. It is also noted that if the frequency of the oscillator 23 in the radar beacon 10 should drift, any such drift would appear to be the same as a Doppler shift. The horizontal line, $f_n$, represents the unmodulated frequency of the oscillator 23 and the point labelled $f_m$ indicates the frequency of the oscillator 23 with maximum deviation. The horizontal line labelled $f_r$ represents the frequency of the local oscillator in the radar receiver 35 which, when heterodyned against the signal received by the antenna 33, produces an output signal from the radar receiver 35. The horizontal line labelled $f_b$ indicated a corresponding frequency for the beacon receiver 41. It may be seen from FIG. 2(a) that so long as the unmodulated frequency $f_n$ of the oscillator 23 is less than that producing frequency $f_n$ and the frequency $f_m$ is greater than that producing $f_b$, two intermediate frequency signals will be produced in the radar receiver 35 and in the beacon receiver 41 during each transmission period of the radar beacon 10.

FIGS. 2(b) through 2(e) have time as their abscissas and voltage as their ordinates. FIG. 2(b) is an idealized sketch of the output signal from the radar receiver 35 consisting of an echo signal from the radar beacon 10 occurring at time $T_0$ and two beacon return signals. The first such signal occurs when the positive-going portion of the signal from the radar beacon 10 meets with $f_r$ and the second occurring when the negative-going portion intersects $f_r$. In addition to the echo signal shown at time $T_0$, it will be recognized that other randomly occurring echo signals could be present.

FIG. 2(c) represents the output of the beacon receiver 41. As may be seen, this output differs from the output of the radar receiver in that no radar echo signal is present and the two beacon signals occur when the frequency modulated signal from oscillator 23 of radar beacon 10 meets with frequency $f_b$.

FIG. 2(d) represents the output of the pulse generator 59 and FIG. 2(e) represents the combined output of the beacon receiver 41 and the pulse generator 59 as applied to the display element 39 when the switch 37 is in the position shown in FIG. 1.

Referring now to FIG. 2(a) and to FIG. 2(c) in particular, let it be assumed that an x-band transpondor system is desired in which the design frequency of the radar receiver 35 is 9380 mHz. and the design frequency of the beacon receiver 41 is 9300 mHz. to allow the greatest permissible drift of, say 40 mHz., in both without any unpermitted overlap. Further, let it be assumed that the unmodulated frequency, $f_n$, of the oscillator 23 in the radar beacon 10 is nominally 9150 mHz.; the frequency $f_m$ of the oscillator 23 at maximum deviation is 9550 mHz.; and the period, 2T, of the sweep generator 21 in the radar beacon 10 is 16 microseconds. The latter two limitations taken together mean, to put it another way, that the frequency of the oscillator 23 nominally is varied linearly from 9150 mHz. to 9550 mHz. and then back to 9150 mHz. at a rate of 50 mHz. per microsecond. With all conditions normal, it may be seen that the first pulse in FIG. 2(c) is delayed three microseconds after the radar echo pulse of FIG. 2(b) and the second pulse is delayed by thirteen microseconds. The halfway point between the two pulses is delayed by eight microseconds. It may be shown that, in any event, so long as two pulses occur the halfway point between the two is always delayed by a fixed amount from the radar echo signal, whether or not such a signal is detected. That is, it may be shown that the halfway point is delayed by a time equal to one-half the length of time the radar beacon 10 is replying. It is then simple for an observer to observe the display unit 39 and estimate very closely the range of the radar beacon 10 by subtracting a fixed distance from the observed halfway point.

FIG. 2(d) may also be more easily understood if numerical values are assigned. Thus, let it be assumed that the output of the adder 57 of FIG. 1 is, before the monostable multivibrator 47, sixteen volts below the cutoff voltage of the pulse generator 59 and that the integration constants of the integrators 53, 55 are such that the slope of their output curves is one volt per microsecond. Thus, in the case discussed above in connection with FIG. 2(d), the output integrator 53 is ten volts above its quiescent voltage when the integrator 55 starts. To put it another way, the level of the signal out of the adder 57 is then six volts below the level of the voltage required to switch on the pulse generator 59. When the integrator 55 starts, the rate of change out of the adder 57 doubles to two volts per microsecond, meaning that the additional six volts required to switch on the pulse generator 59 appear at the output of the adder 57 three microseconds after the integrator 55 starts (or thirteen microseconds after integrator 53 starts). Because integrator 53, as previously noted, starts three microseconds after the radar echo, the net effect is that, in the illustrated case, the pulse in FIG. 2(d) occurs sixteen microseconds after the beginning of the beacon reply signal. It may be shown easily that, regardless of the actual time delays of any two pulses, the single pulse of FIG. 2(d) always occurs at a fixed time delay after the beginning of the beacon reply signal, so an observer of the display unit 39 of FIG. 1 can estimate range very closely.

Referring now to FIG. 3, the logic for an alternative form of beacon receiver at the radar set 12 is shown. The circuit shown in FIG. 3 is intended for use when the radar beacon 10 of FIG. 1 is interrogated at least twice by a signal from the radar set 12 and it is desired that the leading edge of the beacon reply signal ultimately assume a position in range which corresponds as closely as possible to the position of the radar echo from the vehicle supporting the radar beacon 10. In addition, the circuit shown in FIG. 3 is intended to utilize all, or substantially all, of the power in the beacon reply signal.

In FIG. 3 assemblies which perform the same function as similarly numbered assemblies in FIG. 1 are identified with similar numbers. That is, the radar receiver 35 and the beacon receiver 41 are indicated. In the beacon receiver 41 of FIG. 3, a voltage controlled local oscillator 60 is initially maintained at a predetermined frequency (which frequency preferably is midway between the highest and lowest beacon reply signals to be expected) by a modulator 62, which in turn is controlled by a reference source 64, switch 66 then being in its B position rather than in its A position as shown. The output signal from the local oscillator 60 is divided, one portion thereof being fed to a mixer 68 and the other portion being fed to a mixer 70. The second input to the mixer 70 is a portion of the output signal of the local oscillator 72 in the radar receiver 35. The output signal from the mixer 70 is fed through a bandpass amplifier 74 to a discriminator 76. The output of discriminator 76 is fed to an AND gate 78 and a monitor 80. Although, as may be seen, the AND gate 78 is enabled in the absence of a video signal output from the beacon receiver 41 such output is ineffective in controlling the modulator 62 because the switch 66 is in its B position. When, however, it is desired to operate the beacon receiver 41 the switch 66 is placed in its A position, thereby connecting the output signal from the discriminator 76 through the AND gate 78 and the switch 66 to the modulator 62. The various parts of the just described subcircuit are adjusted so that when the switch 66 is in its A position the frequency of the output of the local oscillator 60 is at the midpoint between the limits of frequency expected from any radar beacon 10.

When an interrogating pulse is transmitted from the radar set 12, the radar beacon 10 is actuated as described in connection with FIG. 1 and a beacon reply signal varying in frequency in accordance with the modulation frequency controlled by the sweep generator 21, and normal radar echo signals are returned to the antenna 33 and passed over a transmission line 81 to the mixer 68. The mixer 68 then produces a difference frequency which is within the bandpass of an IF amplifier 82 at a time corresponding to the occurrence of the left hand pulse shown in FIG. 2(c). This signal, on passing through the IF amplifier 82, is divided, a portion being impressed on a high bandpass filter 84, a second portion being impressed on a low bandpass filter 86 and a third portion being impressed on a detector 88. The output terminals of the high bandpass filter 84 and the low bandpass filter 86 are impressed, respectively, on a detector 90 and a detector 92. A portion of the output of the detector 88 (which will be recognized to be a video signal) is passed directly to the display unit 39 of FIG. 1. The remaining portions of the output of the detector 88 are passed to an AND gate 94 and an AND gate 96 to enable both such gates. It should be noted here that when the beacon reply signal is first detected by the detector 88, the IF frequency produced in the mixer 68 is at the lower portion of the band of IF frequencies passed by the IF amplifier 82 and, consequently, that the low bandpass filter 86 then passes a portion of such IF frequency to the detector 92. If, as will be explained in more detail hereinafter, the signal out of the detector 92 is then permitted to control the modulator 62 improper operation of the circuit will result. It is necessary, assuming that the beacon reply signal starts at a low frequency and rises to a high frequency, that a control signal for the modulator 62 be generated in the first instance by the detector 90 which is actuated by the high bandpass filter 84. To accomplish such an end a monostable multivibrator 98 having an astable period of approximately the same length as the period of the sweep generator 21 of FIG. 1 is triggered into its astable condition only after the detector 90 produces an output. The normal output of the monostable multivibrator 98 is connected to the AND gate 96 thereby providing an enabling signal to the AND gate 100 only when there is a video output from the detector 88 and the monostable multivibrator 98 is in its astable position. To complete the circuit an inverter 102 is connected by the output of the detector 88 and the AND gate 78.

The operation of the circuit in FIG. 3 is as follows. When the switch 66 is moved from its B position to its A position the modulator 62, under the control of the discriminator 76, sets the frequency of the local oscillator 60 at a frequency operative with the mid-frequency of the band of frequencies expected in beacon reply signals. Consequently, when radar echo signals and a beacon reply signal are introduced over transmission line 81 to the mixer 68, an IF signal within the bandpass of the IF amplifier 82 is generated but that amplifier acts as a rejection filter for any radar echo signals. The beacon reply signal, which is at this time constantly increasing in frequency, causes a corresponding increase in the frequency of the signal passed through the IF amplifier 82. Even though this signal is initially at the low frequency end of the IF band the signal passed through the low bandpass filter 86 is, as noted previously, now ineffective. When the frequency of the beacon reply signal increases enough that the frequency of the signal through the IF amplifier 82 is higher than the center frequency of such amplifier the high bandpass filter 84 begins to pass a portion of that signal to the detector 90. Since the detector 88 has produced a signal enabling the AND gate 94, the monostable multivibrator 98 is forced into its stable position thereby enabling AND gate 100. A portion of the signal from the AND gate 94 is passed to the modulator 62 which operates to increase the frequency of the local oscillator 60. Those skilled in the art will recognize that the design parameters of the described circuit may be so chosen that the change in frequency of the local oscillator 60 will "track" the change in frequency in the beacon reply signal, the IF signal from the mixer 68 will remain substantially constant and centered on the IF band as long as the frequency of the beacon reply signal increases. When the frequency of the beacon reply signal decreases the IF frequency into the IF amplifier 82 will then too decrease below the center frequency of the IF amplifier 82. The high bandpass filter 84 then becomes a rejection filter and the low bandpass filter 86 then begins to pass a signal. This signal after detection by the detector 92 is passed through the AND gate 100 (now enabled) to the modulator 62. Such a signal causes the modulator 62 to lower the frequency of the local oscillator 60. As a result then the IF frequency out of the mixer 68 is forced back toward the center frequency of the IF amplifier 82.

When the beacon reply signal ends, the AND gates 94, 100 are disabled and the inverter 102 is operative to enable the AND gate 78. As a result, the local oscillator 60 is locked at its lower limit for the following reason until the next beacon reply signal is recovered.

During the time that the beacon reply signal was being received, the changing frequency signal from the local oscillator 60 was being impressed on the mixer 70 without effect insofar as controlling the frequency of the local oscillator 60 is concerned (because the AND gate 78 was then disabled). Such a changing frequency signal is, however, always operative, through the bandpass amplifier 74, to cause a changing output signal from the discriminator 76. At the end of reception of the beacon reply signal the AND gate 78 is enabled and the then existing output signal from the discriminator 76 is impressed on the modulator 62. Such output signal latches the frequency of the local oscillator 60 at its lower value. When the radar set 12 again interrogates the radar beacon 10 and a beacon reply signal is received the AND gate 78 is disabled. The operation of the circuit then is the same as just described in that the local oscillator 60 is caused to "track" the changing beacon reply. There is, however, now no appreciable delay between the receipt of a beacon reply signal and the production of a video signal. Therefore, the circuit "tracks" the beacon reply signal as long as it is being received, producing one single relatively long video signal, the front edge of which corresponds very closely to the position of the radar echo. It is noted here that conventional pulse compression or leading edge enhancement techniques may be applied to the video signal output if so desired. The successive interrogations simply cause the circuit to repeat its action.

The monitor 80, which is simplified form may be a cathode ray tube display having the same range sweep as the display for the radar receiver, may be used to display the output of the discriminator 76. The output of the discriminator 76, as noted hereinbefore, is analogous to the frequency of the local oscillator 60. Consequently, when the local oscillator 60 is tracking on the beacon reply signal the presentation on the monitor 80 corresponds to the wave shape shown in FIG. 2(a). A moment's thought will make it clear that if the sweep generator 21 in the radar beacon 10 is changed, then the appearance of the waveform displayed in the monitor 80 will also change and that coding may be accomplished in this manner to identify individual beacons.

While the described embodiments of this invention are useful to an understanding thereof, it will be immediately apparent to those having skill in the art that the concept of varying the frequency of a beacon return signal in such a manner as to increase the power available in the signal processed by a receiver and to provide accurate range information may be implemented in other ways. It is felt, therefore, that the invention should not be restricted to its disclosed embodiments but rather should be limited only by the spirit and scope of the following claims.

What is claimed is:
1. A radar transponder system, comprising:
   (a) a radar beacon, responsive to an interrogating signal from a radar set, for producing a frequency-modulated reply signal, the frequency of such reply signal varying throughout a wide band of frequencies from a first limit to a second limit and then back to the first limit;
   (b) a heterodyne receiver, disposed at the radar set and responsive only to a narrow band of frequencies within such wide band, for detecting at least a first portion of the frequency-modulated signal as such signal varies from its first limit and for detecting at least a second portion of the frequency-modulated signal as such signal varies from its second limit to its first limit;
   (c) a display unit on which the output signals from the heterodyne receiver are displayed on a time base analogous to the range sweep of the radar set; and
   (d) signal processing circuits, responsive to the signals out of the heterodyne receiver, for producing a single signal on the time base of the display unit, such single signal having a fixed delay measured from the time that the wide band of frequencies from the radar beacon is first impressed on the heterodyne receiver.

2. A radar transponder system comprising:
   (a) a radar beacon, responsive to an interrogating signal from a radar set, for producing a frequency-modulated reply signal, the frequency of such reply signal varying throughout a wide band of frequencies from a first limit to a second limit;
   (b) a heterodyne receiver having a local oscillator and a narrow band intermediate frequency amplifier, such local oscillator being tunable throughout the wide band of frequencies of the frequency-modulated reply signal;
   (c) first tuning means, responsive to changes in the frequency of the frequency-modulated reply signal, for tuning the local oscillator in synchronism with such changes; and
   (d) second tuning means for the local oscillator, such second tuning means being operative initially to set the frequency of the local oscillator at the mid-frequency of its tuning range.

3. A radar transponder system as in claim 2 having, in addition, third tuning means for the local oscillator, such third tuning means being operatively only when the beacon reply signal is not being received to lock the frequency of the local oscillator at its last set frequency.

4. A radar transponder system as in claim 3 having, in addition, monitor means for displaying on a time base analogous to the range sweep of the radar set, a signal analogous to the output signal of the first tuning means.

References Cited

UNITED STATES PATENTS

| | | | |
|---|---|---|---|
| 2,544,204 | 3/1951 | Whitfield et al. | 343—6.8X |
| 2,962,707 | 11/1960 | Cleeton | 343—6.5 |
| 3,168,735 | 2/1965 | Cartwright | 343—17.2X |
| 3,241,137 | 3/1966 | Small | 343—6.8 |
| 3,427,613 | 2/1969 | Kawahara et al. | 343—6.5(SS) |
| 3,427,617 | 2/1969 | Richman | 343—17.2 |

RODNEY D. BENNETT, Primary Examiner

M. F. HUBLER, Assistant Examiner

U.S. Cl. X.R.

343—6.8, 17.2